Sept. 17, 1929.    W. SCHEM    1,728,576
ANIMAL TRAINING AND RACING APPARATUS
Filed July 19, 1927    5 Sheets-Sheet 1
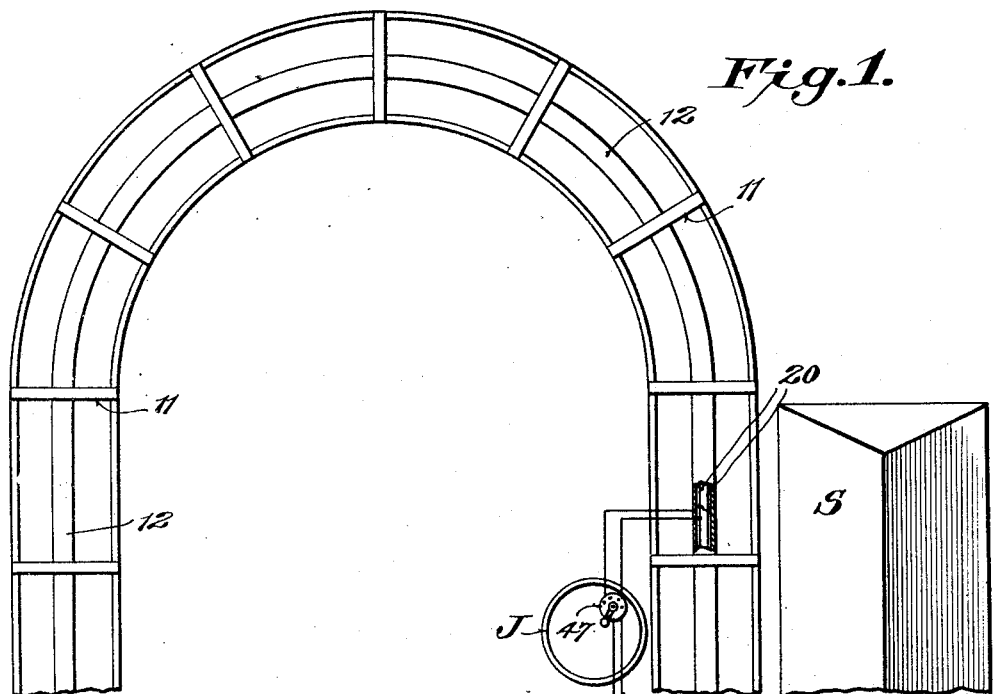
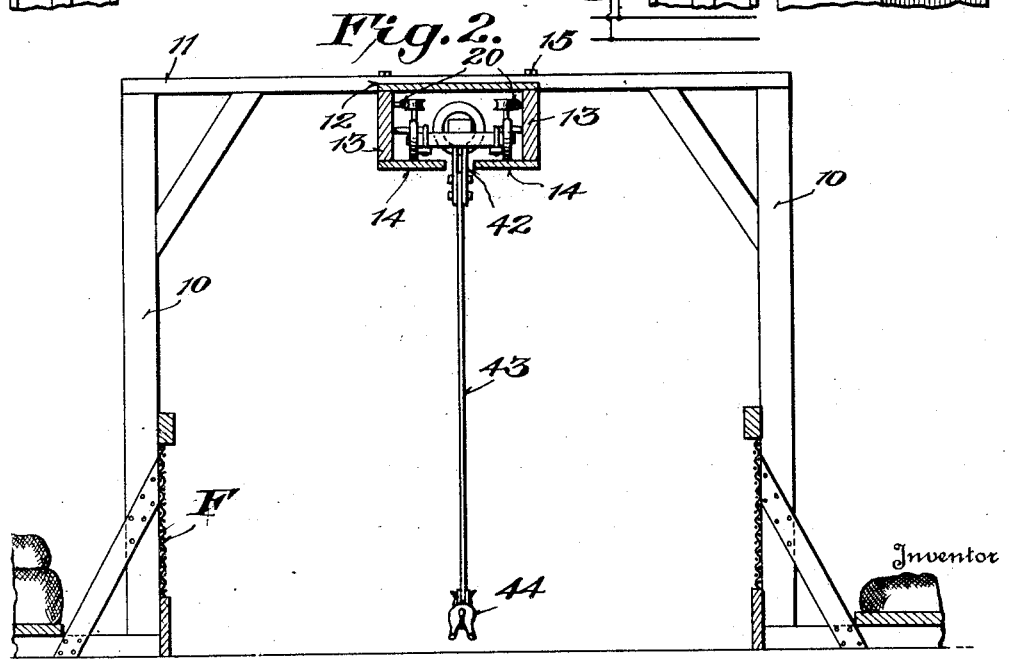

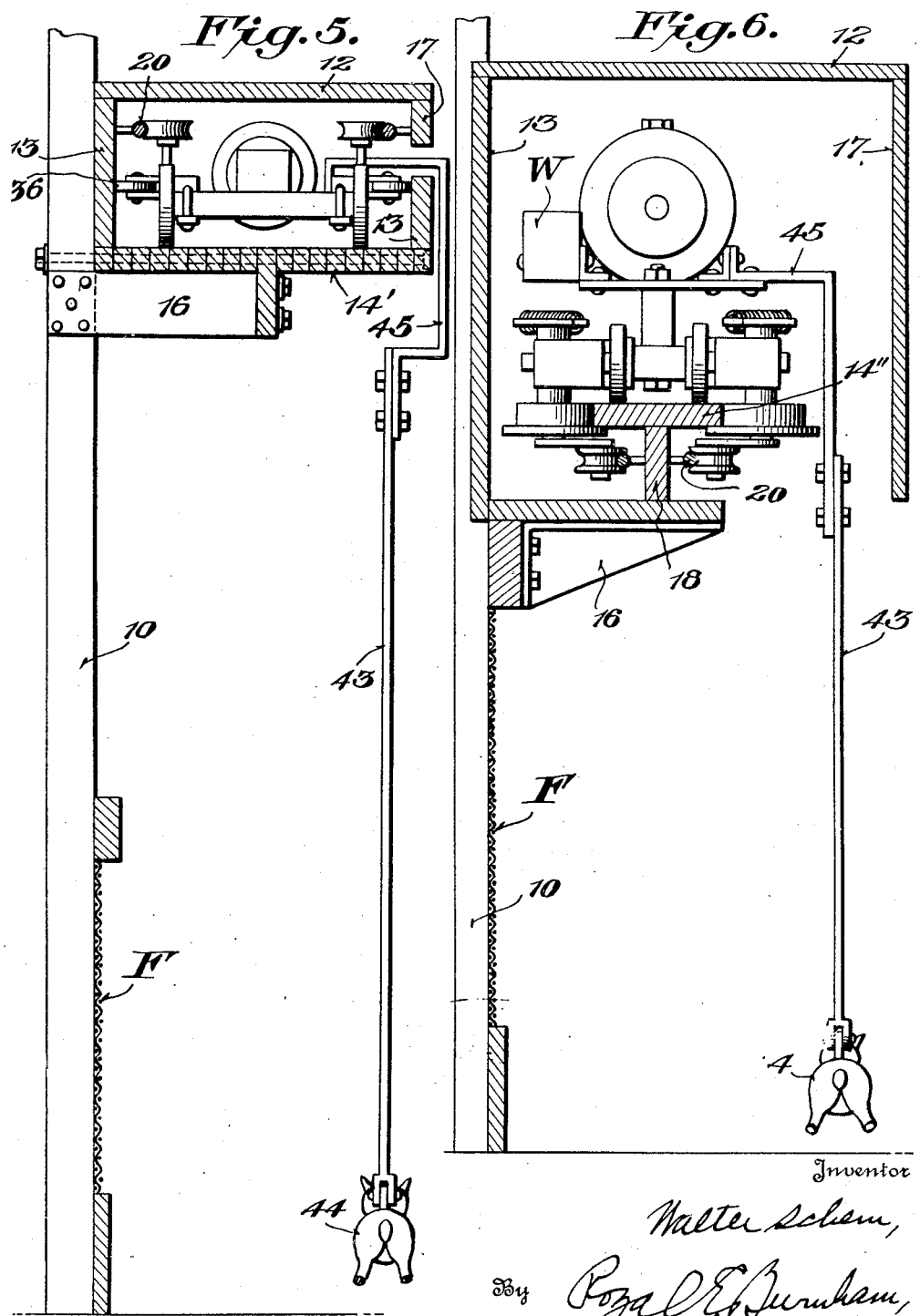

Sept. 17, 1929. W. SCHEM 1,728,576
ANIMAL TRAINING AND RACING APPARATUS
Filed July 19, 1927 5 Sheets-Sheet 4
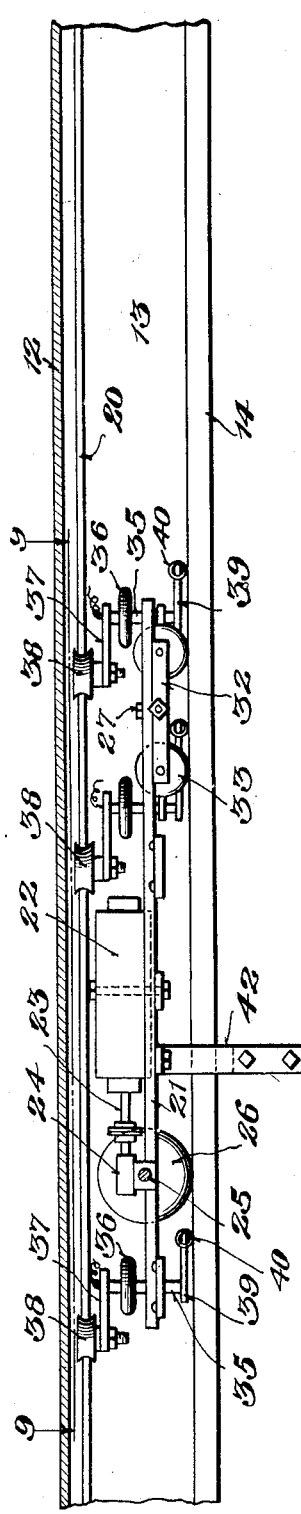
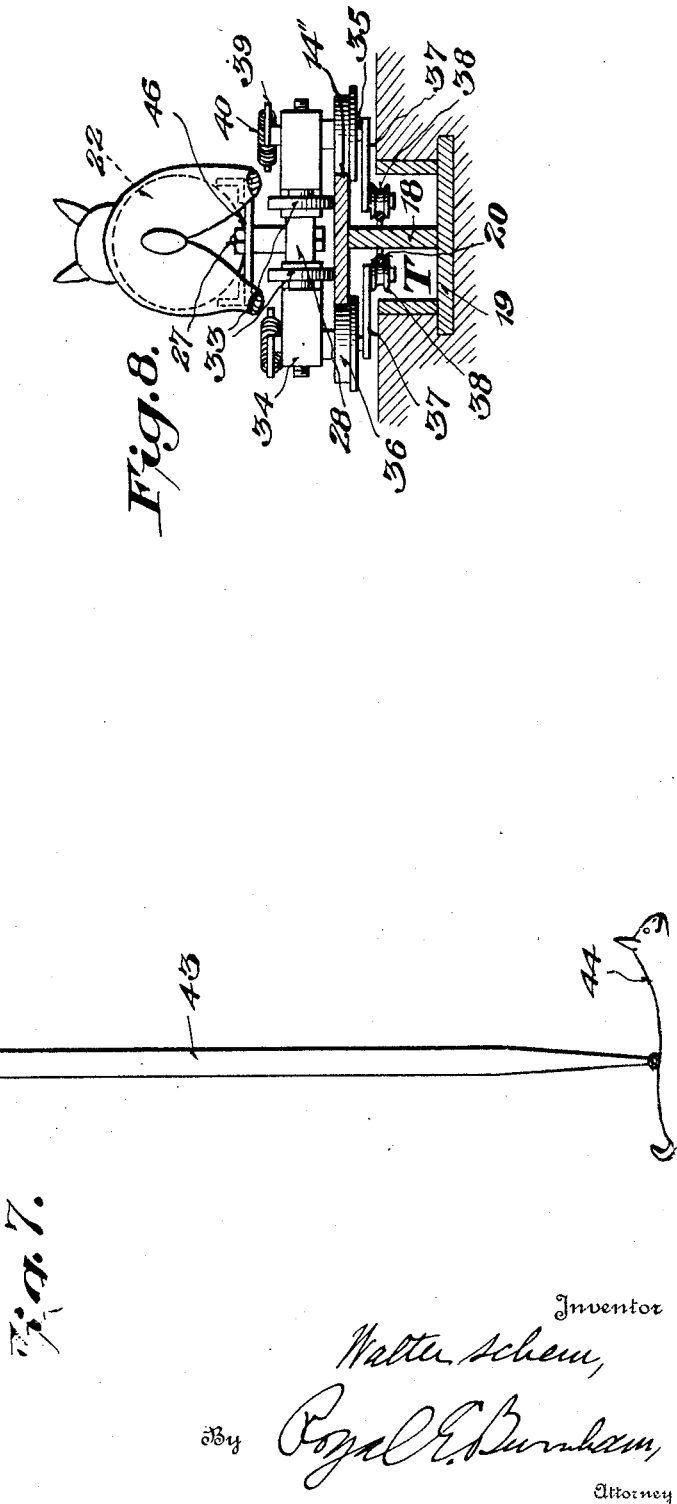

Sept. 17, 1929.  W. SCHEM  1,728,576
ANIMAL TRAINING AND RACING APPARATUS
Filed July 19, 1927   5 Sheets-Sheet 5
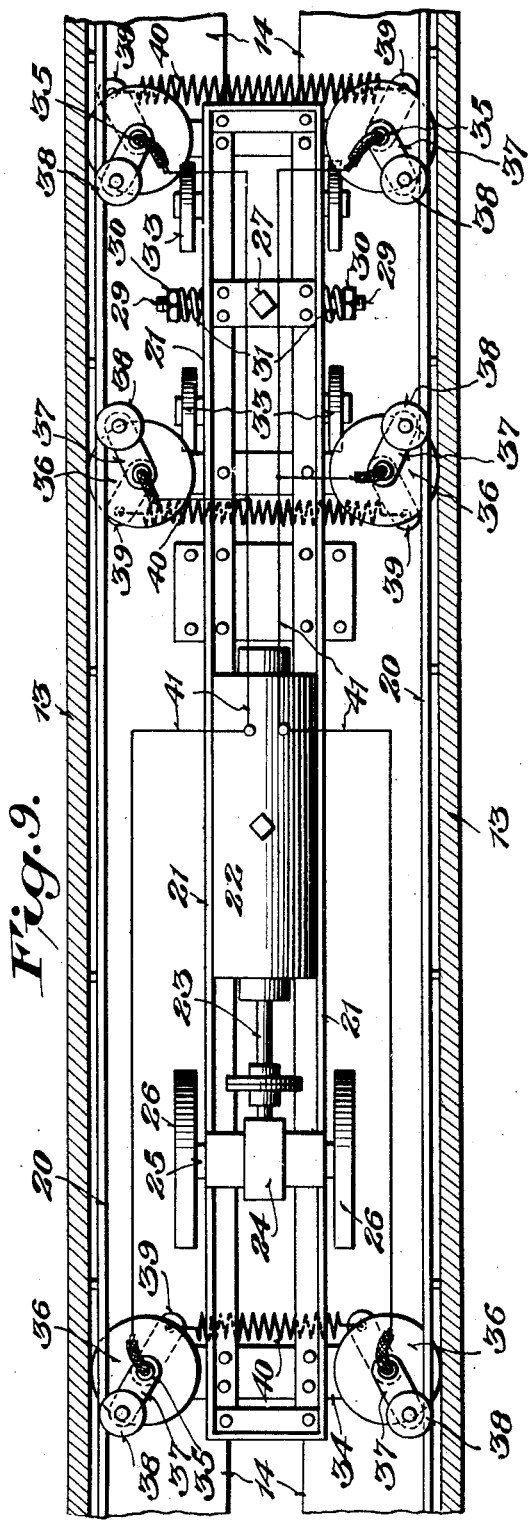

Patented Sept. 17, 1929

1,728,576

UNITED STATES PATENT OFFICE

WALTER SCHEM, OF SCRANTON, PENNSYLVANIA, ASSIGNOR OF ONE-FOURTH TO WHITFIELD BROOKE, OF BILOXI, MISSISSIPPI, AND ONE-FOURTH TO TRENT R. BARRE, OF COLUMBUS, OHIO

ANIMAL TRAINING AND RACING APPARATUS

Application filed July 19, 1927. Serial No. 206,849.

This invention relates to apparatus for the training of animals to develop their speed, and for racing them.

A track for the training and racing of dogs and other comparatively small animals usually comprises a course inside of substantially parallel fences between which the animals are induced to run after a lure conveyed in advance of them.

It has been found that, when a lure is carried by a member projecting into the course from the side, the animals, upon overtaking the lure and in backcoursing, are liable to run against, and be injured by, the supporting member; that, when the lure is on a member extending upwardly through a slot from an underground conveyer, the animals sometimes get their feet caught in the slot, and thus are injured; and that, when the conveyer runs on rails of conventional type on the ground, similar disadvantages attend their use.

Moreover, when the lure is conveyed in any of those ways, it is necessary, in the case of hurdle races, to provide hurdles with openings through which the lure passes and which are closed by tripped doors that shut before the animals reach the hurdles. Such doors complicate the hurdles, increase the expense of manufacture, and necessitate their resetting for a subsequent race.

In order to avoid those and other disadvantages that heretofore have attended the training and racing of small animals, the invention provides for overhead disposition of the lure conveyer and carrier; and it also provides a ground-located structure so formed that it leaves the course free of interference with the running of the animals.

The invention also provides a lure-conveyer that is adapted to run on tracks of different types, whereby it is suitable for use on various sorts of overhead and ground supports.

When considered with the description herein, the characteristics of the invention are apparent from the accompanying drawings, forming part hereof, wherein adaptations of the invention particularly to the training and racing of dogs are disclosed, for purposes of illustration.

Although the disclosures herein exemplify what now are considered to be preferable embodiments of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Fig. 1 is a fragmentary plan of the apparatus, certain parts being broken away, and the electric circuits being shown diagrammatically;

Fig. 2 is a cross section of one form of apparatus;

Fig. 5 is an elevation of the lure conveyer and carrier in association with one form of track structure shown in section;

Fig. 6 is an elevation of the lure conveyer and carrier in association with another form of track structure shown in section;

Fig. 7 is a side elevation in the lure-conveyer in a track structure;

Fig. 8 is an end elevation of the lure-conveyer on a ground-located track structure shown in section;

Fig. 9 is a plan view of the lure-conveyer.

Fencing and track structures

Figure 3:
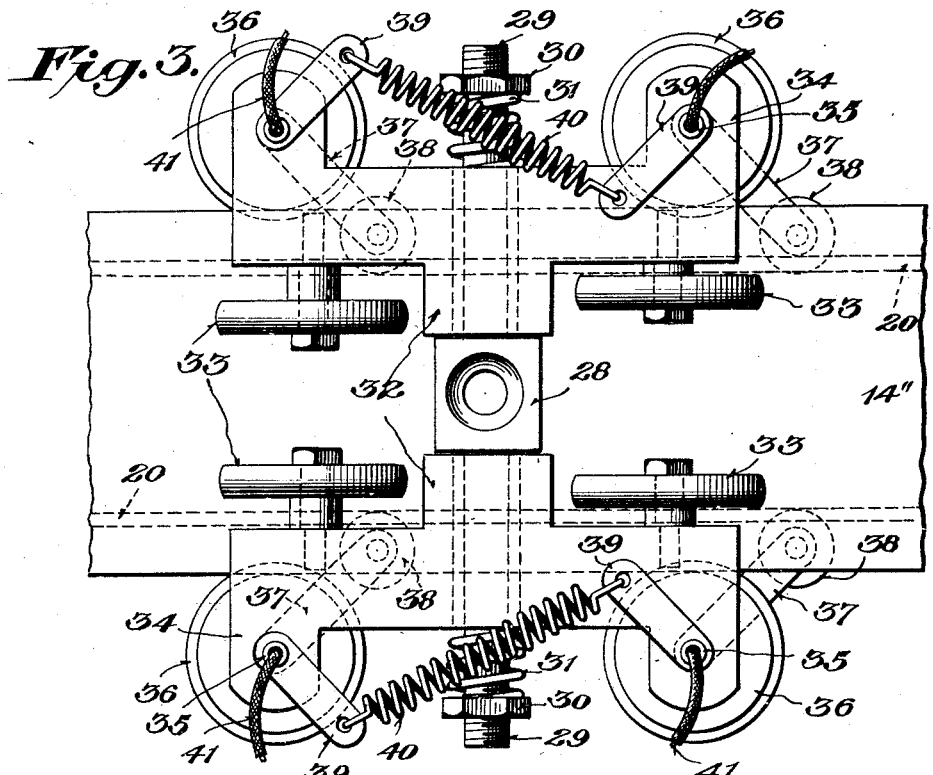
Fig. 3 is a plan view of the front truck of the conveyer.
Figure 4:
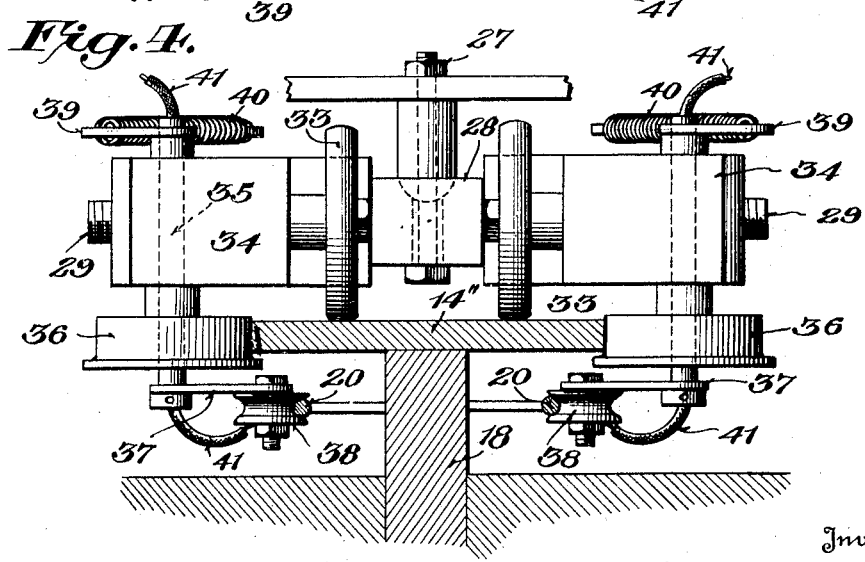
Fig. 4 is an end view thereof.

A track for the training and racing of small animals is exemplified by Fig. 1, wherein S designates a spectators' stand, and J a stand for judges and operators of the track.

One form of overhead installation, as illustrated by Fig. 2, includes oppositely-disposed uprights 10, which may be lengthened posts of fencing as shown. Every pair of oppositely-disposed uprights 10 carries at the top a cross member 11, and the cross member supports the track structure in which the lure-conveyer runs.

That structure comprises a cover 12 under the cross member and disposed longitudinally and approximately above the center line of the course; side members 13 depending from the cross members; and oppositely-disposed flat tracks 14 extending inwardly from the side members, the tracks being of such width as to leave a continuous slot or opening between their inner edges for a purpose hereinafter explained. The parts of the track structure may be held together in any suitable manner, as by bolts 15 extending through the cross members, and they preferably should have weather-tight assembly to provide a housing that affords protection to the lure-conveyer and other instrumentalities therein.

Another form of track structure, suitable for mounting on permanent fencing already in place and defining the boundaries of the course, as well as fencing built to accommodate it, is illustrated by Fig. 5.

That structure, like the other form, includes a cover 12, side members 13, and a flat track 14'. The cover and track are supported, respectively, by brackets 16 secured to the fence-posts 10, and siding 17 opposite to the posts depends from the cover to such place as to leave a continuous slot between it and the outer side of member 13, for a purpose hereinafter explained.

Still another form of track structure is disclosed by Figs. 6 and 8; and it includes a longitudinally-extending upright 18, on which is mounted a flat track 14'', which extends around the course.

When such a track structure is positioned at the surface of the ground, as shown by Fig. 8, the upright 18 is anchored to transverse members 19 buried in the ground at the bottom of a continuous comparatively shallow trench T, and the track 14'' is positioned slightly above the top of the trench. The track is as wide as, or wider than, the top of the trench, in order to constitute a cover that will prevent the legs of animals from getting into the trench.

When a T-shaped track structure such as shown by Fig. 8 is disposed along the side of a fence, the upright 18 is mounted on the brackets 16, as shown by Fig. 6.

In the forms of track structure disclosed by Figs. 2 and 5, oppositely-disposed electric conductors 20 are mounted on the side members 13, and in the T-form structure the conductors are mounted on the sides of the upright 18.

Lure-conveyer

The lure-conveyer comprises a frame 21, upon which is mounted a motor 22 having a drive-shaft 23 arranged to drive, through the instrumentality of suitable gearing in a case 24, an axle 25 journaled on the rear part of the frame and having fast thereon drive-wheels 26. The conveyer-frame is supported at the front, and pivotally connected by a king-bolt 27 with a four-wheel truck.

The truck comprises a central member 28, through which the king-bolt extends; shafts 29 projecting laterally from each side of the central member, having nuts 30 on their outer terminals and coil-springs 31 inside of the nuts; side members 32, through which the shafts 29 extend, and which are held against the central member by the coil-springs; and carrying-wheels 33 journaled on the inner sides of the member 32 arranged to run on the tracks.

The frame 21 at the rear and the truck members 32 have oppositely-disposed outwardly-extending pairs of projections 34, in which are mounted for rockable movement upright hollow shafts 35. Guide-wheels 36 journaled on those shafts contact with the side members 13 of the overhead forms of track structure and thus guide the conveyer while in motion. Arms 37, fast on the upper portions of the shafts 35, carry any suitable type of contact members, such, for example, as trolley-wheels 38, which run in contact with the conductors 20. Reliable contact of those wheels with the conductors is maintained by pairs of arms 39, fast on those shafts, and connected by springs 40. The contact members 38 are connected with the motor by conductors 41, which extend through the shafts 35.

Three pairs of contact members 38 are provided—one pair on the frame and two on the truck—in order that it may be certain that at least one of them on each side at all times is in contact with the line conductors 20 on its side and thus avoid breakage of the circuit through the motor at any time owing to curves and irregularities of the track structure encountered during progress of the conveyer.

When a conveyer that has been used with an overhead track structure such as shown by Figs. 2 and 5 is to be employed on a T-form track such as shown by Figs. 6 and 8, adaptation to the latter form of track readily can be made, by removing the supports of the underslung lure-carrier hereinafter described, and by making other changes; namely:

The truck members 32 are swung over on the shafts 29 to reverse the upper and lower sides thereof. This brings the guide-wheels 36 to underneath position in contact with the edges of the track 14'', against which they are held by the springs 31. If desired, the guide-wheels may be formed with peripheral flanges 35' arranged to extend under the track to prevent the conveyer from jumping therefrom.

The trolley-wheels 38 also are brought to underneath position to run in contact with the conductors 20 on the upright 18. In order to retain the trolley-wheels against the conductors, the springs 40 are disconnected from opposite arms 39 as shown by Fig. 9 and reconnected to the two on each side of the truck, as shown by Fig. 3.

A similar redisposition of the guide and trolley wheels on the rear portion of the conveyer also is made.

*Lure-carrier*

When the conveyer runs on an overhead type of track structure such as exemplified by Fig. 2, the lure-carrier is supported by members 42 connected to the under side of the conveyer-frame and depending therefrom through the slot between the tracks 14. A member or members 43 are connected to the supports 42 in any suitable manner, and a lure 44 is at the lower end thereof.

When the conveyer runs on an overhead type of track structure such as exemplified by Figs. 5 and 6, a supporting member 45 on the conveyer depends through the slot between the member 13 and the siding 17, and the member 43 of the carrier is secured to and depends therefrom. In that instance the lure-carrier is counterbalanced by weights W on the opposite side of the conveyer.

When the conveyer runs on a ground-located track structure such as exemplified by Fig. 8, the lure is mounted on and covers a frame or other suitable support 46 on top of the conveyer.

*Operation*

The electric conductors 20 are connected with a control device 47 of conventional form in the judges' stand or in any other desired place, and the starting and stopping of the lure-conveyer, and the regulation of its speed to keep it in advance of the pursuing animals, are controlled by that device, which is arranged to vary the potential in the conductors.

What I claim as new, and desire to secure by Letters Patent, is—

1. In a lure-conveyer, side members reversible in substantially vertical planes, carrying-wheels on said members, and guide-wheels on said members rotatable about substantially vertical axes.

2. In a lure-conveyer, a central member, shafts extending laterally therefrom, side members turnable on said shafts to reverse their upper and lower sides, carrying-wheels on said side members, and guide-wheels on said side members rotatable about substantially vertical axes.

3. In a lure-conveyer, a central member, shafts extending laterally therefrom, side members turnable on said shafts to reverse their upper and lower sides, springs restraining outward movement of said side members on said shafts, and guide-wheels on said side members rotatable about substantially vertical axes.

4. In a lure-conveyer, side members reversible in substantially vertical planes, carrying-wheels on said members, substantially upright shafts on said members, and guide-wheels on said shafts.

5. In a lure-conveyer, side members reversible in substantially vertical planes, carrying-wheels on said members, substantially upright shafts on said members, and guide-wheels and current-collectors on said shafts.

6. In a lure-conveyer, a pair of side members reversible in substantially vertical planes, rockable substantially upright shafts on said members, current-collectors fast on said shafts, a radial arm fast on each of said shafts, and springs for interchangeably connecting said arms.

7. In a lure-conveyer, a pair of side members reversible in substantially vertical planes, rockable substantially upright shafts on said members, current-collectors fast on said shafts, a radial arm fast on each of said shafts, and springs connectable either to the arms on the same side or opposite sides.

8. In a lure-conveyer, a rockable hollow shaft, a current-collector fast on said shaft, a conductor connected with said collector disposed through said shaft, and means associated with said shaft whereby said collector is pressed against a line conductor.

9. In a lure-conveyer, a rockable hollow shaft, a current-collector fast on said shaft, a conductor connected with said collector disposed through said shaft, a guide-wheel journaled on said shaft, and means associated with said shaft whereby said collector is pressed against a line conductor.

10. A lure-conveyer comprising a frame, drive-wheels thereon, an electric motor arranged to drive said wheels, and a truck including side members, carrying-wheels journaled thereon, and current collectors on said side members, said side members being reversible to dispose said collectors above or below the surface upon which said wheels are to run, and conductors connecting said collectors and motor.

11. The combination, with a track and an electric conductor disposed longitudinally with respect thereto, of an electrically-propelled conveyer comprising a side member, and a current-collector thereon, said side member being reversible to dispose said collector above or below said track in accordance with the location of said conductor with respect thereto.

12. The combination, with a track and electric conductors disposed longitudinally with respect thereto, of an electrically-propelled conveyer comprising side members, current-collectors thereon, said side members being reversible to dispose said collectors above or below said track in accordance with the location of said conductors with respect thereto, and means whereby said collectors are pressed against said conductors in each position.

13. The combination, with a track and electric conductors disposed longitudinally with respect thereto, of an electrically-propelled conveyor comprising oppositely-disposed side members reversible in substantially vertical planes, carrying-wheels thereon traversable of said track in either position of said members, guide-wheels on said members contactable with edges of said track when in one position, and current-collectors on said members contactable with said conductors either above or below said track in accordance with the disposition of said side members.

14. The combination, with an upright support, a flat track thereon, and an electric conductor disposed longitudinally with respect thereto, of a conveyer comprising carrying-wheels, guide-wheels contactable with opposite edges of said track, and a current-collector contactable with said conductor.

15. The combination, with an upright support, a flat track thereon, and electric conductors disposed on each side of said support, of a conveyer comprising carrying-wheels, guide-wheels contactable with opposite edges of said track, current-collectors, and means whereby said collectors are pressed against said conductors.

16. The combination, with an upright support, a flat track thereon, and electric conductors disposed on each side of said support, of a conveyor comprising side members, carrying-wheels thereon, guide-wheels contactable with opposite edges of said track, current-collectors, and means whereby said collectors are pressed against said conductors, said side members being reversible to bring said collectors to higher disposition to accommodate them to another location of said conductors.

17. In a race-course having a continuous trench extending therearound, a track structure comprising a support in said trench, and a conveyer-track on said support above and covering the top of said trench.

18. In a race-course having a continuous trench extending therearound, a track-structure for an electrically-propelled lure-conveyer comprising an upright support in said trench, a track on said support above and covering the top of said trench, and an electric conductor on said support for supplying current to the conveyer.

19. A track structure of an electrically-propelled lure-conveyer comprising an upright support, electric conductors on each side thereof, and a flat track having substantially parallel side edges arranged to be contacted by conveyer guide-wheels.

In testimony whereof I affix my signature.
WALTER SCHEM.